United States Patent
Roy et al.

(10) Patent No.: US 10,783,226 B2
(45) Date of Patent: Sep. 22, 2020

(54) SYSTEM AND METHOD OF UTILIZING A STYLUS

(71) Applicant: Dell Products L.P., Round Rock, TX (US)

(72) Inventors: Mainak Roy, Kolkata (IN); Rathi Babu, Bangalore (IN); Amrita Nistala, Vishakapatnam (IN); Avinash Vishwanath, Bangalore (IN); Vamsi Krishna, Chennai (IN)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 16/121,350

(22) Filed: Sep. 4, 2018

(65) Prior Publication Data

US 2020/0074057 A1  Mar. 5, 2020

(51) Int. Cl.
| | |
|---|---|
| *G06F 21/32* | (2013.01) |
| *G06K 9/00* | (2006.01) |
| *G06F 3/0354* | (2013.01) |
| *G06F 21/31* | (2013.01) |

(52) U.S. Cl.
CPC .......... *G06F 21/32* (2013.01); *G06F 3/03545* (2013.01); *G06F 21/316* (2013.01); *G06K 9/00087* (2013.01)

(58) Field of Classification Search
CPC .... G06F 21/32; G06F 3/03545; G06F 21/316; G06F 3/0383; G06K 9/00087
See application file for complete search history.

(56) References Cited

U.S. PATENT DOCUMENTS

| | | | | |
|---|---|---|---|---|
| 6,539,101 | B1* | 3/2003 | Black | G06K 9/00006 382/124 |
| 7,609,862 | B2* | 10/2009 | Black | G06K 9/0002 382/124 |
| 7,961,917 | B2* | 6/2011 | Black | G06F 21/32 382/124 |
| 8,928,635 | B2 | 1/2015 | Harley et al. | |
| 2012/0331546 | A1* | 12/2012 | Falkenburg | G06F 3/044 726/16 |
| 2015/0235391 | A1 | 8/2015 | Makino et al. | |
| 2018/0039368 | A1 | 2/2018 | Choi et al. | |
| 2018/0253163 | A1* | 9/2018 | Berger, Jr. | G06N 5/043 |
| 2018/0329526 | A1 | 11/2018 | Peretz et al. | |
| 2019/0278893 | A1* | 9/2019 | Eisen | G06F 3/03547 |
| 2020/0064937 | A1* | 2/2020 | Wassvik | G06F 21/35 |
| 2020/0117150 | A1* | 4/2020 | Chakra | A01M 1/10 |

\* cited by examiner

*Primary Examiner* — Christopher A Revak
(74) *Attorney, Agent, or Firm* — Baker Botts L.L.P.

(57) ABSTRACT

In one or more embodiments, one or more systems, methods, and/or processes may determine a first force value of the stylus in contact with a surface; may determine a first profile associated with the first user; may determine that the first force value is not included by the first profile; if multiple force values of the first profile are within a range of the first force value, may determine a first response value based at least on multiple response values of the first profile respectively associated with the multiple force values of the first profile within the range; and if multiple force values of at least one other profile are within the range, may determine the first response value based at least on multiple response values of the at least one other profile respectively associated with the multiple force values of the at least one other profile within the range.

20 Claims, 9 Drawing Sheets

SYSTEM AND METHOD OF UTILIZING A STYLUS

BACKGROUND

Field of the Disclosure

This disclosure relates generally to information handling systems and more particularly to utilizing styli with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine, via a biometric sensor, first biometric information associated with a first user; may determine that the first user is authenticated to utilize a stylus based at least on the first biometric information; may determine, via a force sensor, a first force value of the stylus in contact with the surface; may determine a first profile associated with the first user based at least on the first biometric information; may search the first profile for the first force value; may determine that the first force value is not included by the first profile; may determine if multiple force values of the first profile are within a range of the first force value; if the multiple force values of the first profile are within the range of the first force value, may determine a first response value based at least on multiple response values of the first profile respectively associated with the multiple force values of the first profile that are within the range of the first force value; if the multiple force values of the first profile are not within the range of the first force value, may determine if multiple force values of at least one other profile are within the range of the first force value; if the multiple force values of the at least one other profile are within the range of the first force value, may determine the first response value based at least on multiple response values of the at least one other profile respectively associated with the multiple force values of the at least one other profile that are within the range of the first force value; if the multiple force values of the at least one other profile are not within the range of the first force value, may determine the first response value based at least on the first force value; may store the first response value in the first profile as being associated with the first force value; and may provide information based at least on the first response value to an information handling system.

In one or more embodiments, the first biometric information may include first fingerprint information associated with the first user. In one or more embodiments, determining the first response value based at least on the multiple values of the first profile respectively associated with the multiple force values of the first profile that are within the range of the first force value may include interpolating the first value based at least on the multiple values of the first profile respectively associated with the multiple force values of the first profile that are within the range of the first force value. In one or more embodiments, determining the first response value based at least on the multiple values of the at least one other profile associated with the multiple force values of the at least one other profile that are within the range of the first force value may include interpolating the first value based at least on the multiple values of the at least one other profile associated with the multiple force values of the at least one other profile that are within the range of the first force value.

In one or more embodiments, the one or more systems, methods, and/or processes may further compute a logarithm based at least on the first force value. For example, determining the first response value based at least on the first force value may include computing a logarithm based at least on the first force value. In one or more embodiments, the one or more systems, methods, and/or processes may further determine that the at least one other profile includes the first force value; may further retrieve a response value of the at least one other profile associated with the first force value; and may further determine the first response value as the response value of the at least one other profile associated with the first force value. In one or more embodiments, the one or more systems, methods, and/or processes may further determine that the stylus is in an eraser mode and may further provide information to the information handling system that indicates a number of pixels of a display should be changed based at least on the first response value and the eraser mode.

In one or more embodiments, the one or more systems, methods, and/or processes may further determine that the first user taps a biometric sensor of the stylus and, after determining that the first user is authenticated to utilize the stylus based at least on the first biometric information, may further switch from a writing mode of the stylus to an eraser mode of the stylus. In one or more embodiments, the one or more systems, methods, and/or processes may further acquire, via a biometric sensor, a fingerprint from the first user. For example, determining the first biometric information associated with the first user may include determining the first biometric information from the fingerprint. In one or more embodiments, the one or more systems, methods, and/or processes may further determine that the first force value is included by the first profile and may further retrieve the first response value from the first profile.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
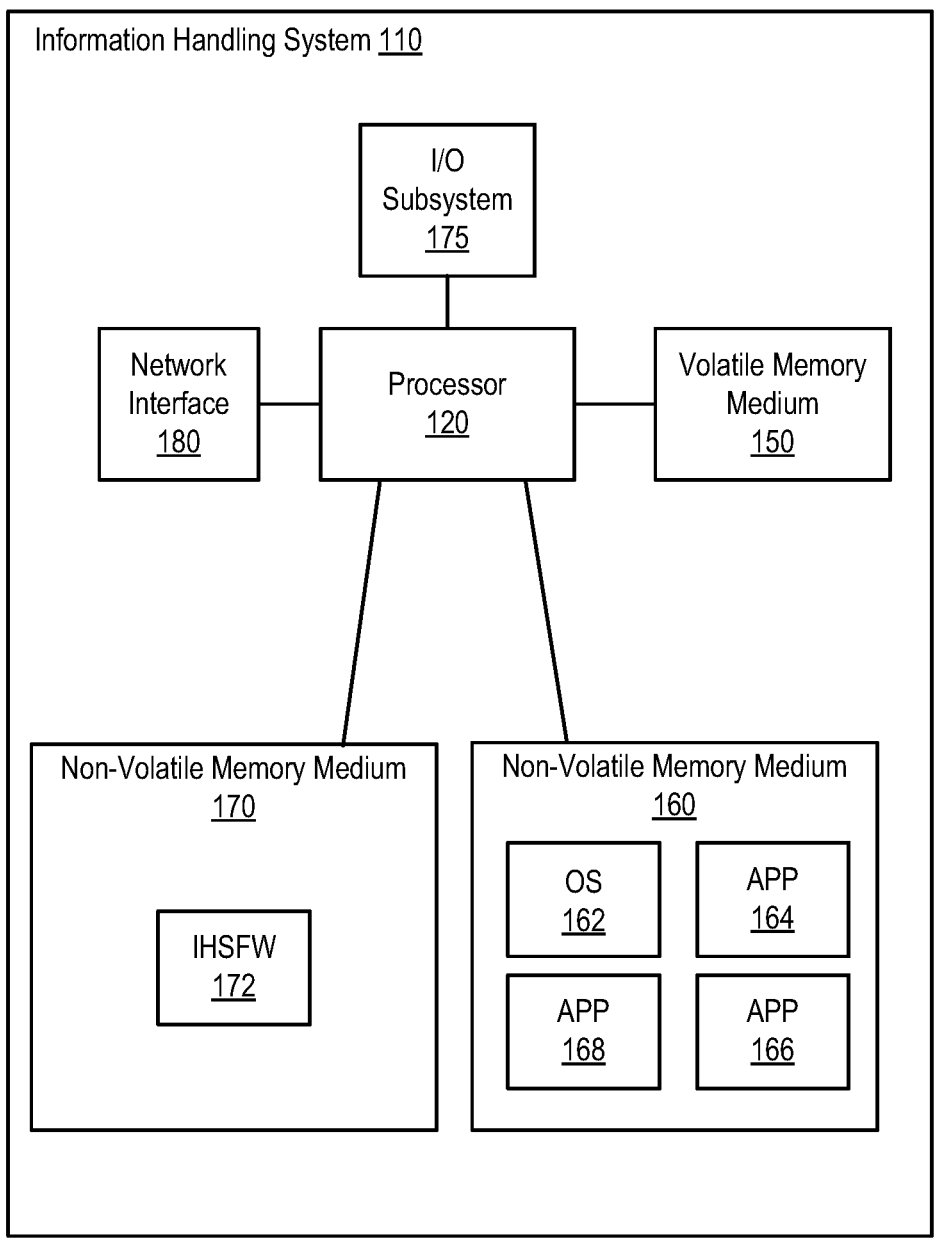
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, styli may be associated with different sizes, different shapes, and/or different capabilities based at least on needs and/or desires of users. For example, styli may be configured to perform multiple functions. In one instance, styli may be customized to work for a particular application and/or a particular device. In another instance, manufacturers of styli may design and/or configure a stylus with one or more particular enhancements.

In one or more embodiments, a stylus may be utilized with a range of forces. For example, a user may configure one or more ranges of forces for one or more applications. In one instance, the user may configure a force for markups, pointing, note taking applications, and/or erasing. In another instance, the user may configure one or more forces for one or more paint brushes, one or more felt pens, one or more erasers, one or more charcoals, one or more crayons, and/or one or more calligraphy pens, among others. In one or more embodiments, a stylus may be capable of one or more low forces and may be associated with a response curve that can be shaped to simulate that of a higher force. For example, a single stylus can be configured and/or customized to satisfy a range of uses and/or users (e.g. artists, note takers, etc.). In one instance, the stylus may be configured with an activation force of 0.049 Newtons (e.g., 5 g), which may be utilized in an artistic context. In a second instance, the stylus may be configured with an activation force of 0.196 Newtons (e.g., 20 g), which may be utilized in a note-taking context. In another instance, the stylus may be configured with an activation force of 0.49 Newtons (e.g., 50 g), which may be utilized in an erasing context.

In one or more embodiments, a data structure may be populated with initial force values. For example, an initial force value may be associated with a force (e.g., a pressure) of a stylus in contact with a surface. In one instance, the initial force value may be associated with an activation of a number of pixels. In another instance, the initial force value may be associated with a deactivation of a number of pixels. In one or more embodiments, a stylus tip may be utilized to write and erase. For example, utilizing the stylus tip to write and erase may abrogate multiple tips for different actions. In one or more embodiments, an erasing activity may be application independent. For example, a stylus may control and/or regulate the erasing activity. For instance, by being application independent, updates to an application (e.g., by an original equipment manufacturer (OEM)) may not be necessary.

In one or more embodiments, a stylus may include a biometric sensor. For example, the biometric sensor may include a fingerprint reader and/or scanner. In one or more embodiments, the biometric sensor may be utilized in switching between or among two or more functionalities of the stylus. In one example, the biometric sensor may be utilized in switching between writing and erasing functionalities of the stylus. In one instance, first biometric information (e.g., first fingerprint information from a first finger of a user) may be utilized in determining a first functionality of the stylus (e.g., writing). In another instance, second biometric information (e.g., second fingerprint information from a second finger of the user) may be utilized in determining a second functionality of the stylus (e.g., erasing). In another example, a motion sensor may be utilized in switching between writing and erasing functionalities of the stylus. For instance, a user may tap the biometric sensor to switch between a writing mode of the stylus and an eraser mode of the stylus.

In one or more embodiments, a biometric sensor of the stylus may determine fingerprint information from a finger of a user. For example, a digital image may be created. For instance, the digital image may be converted to a code (e.g., fingerprint information). In one or more embodiments, the biometric sensor of the stylus may be or include a fingerprint sensor. In one or more embodiments, profiles may be associated with biometric information. For example, profiles may be associated with fingerprint information. For instance, profiles may be associated with respective users, which may be associated with fingerprint information. In one or more embodiments, fingerprint information may be determined from a fingerprint of a user. For example, a profile may be determined based at least on the fingerprint information associated with the user. For instance, the profile may store the fingerprint information associated with the user. In one or more embodiments, the fingerprint information may be stored via an authentication module. For example, a control unit of the stylus may include the authentication module. In one or more embodiments, fingerprint information may be associated with a profile. In one example, first fingerprint information may be associated with a first profile. In another example, second fingerprint information may be associated with a second profile.

In one or more embodiments, a default mode associated with a stylus may be a writing mode. For example, a user may utilize the stylus to write on a display, with the stylus in its default mode. In one or more embodiments, a mode of the stylus may be changed. In one example, the user may tap the stylus to change to a writing mode. For instance, the user may tap a fingerprint sensor of the stylus to change to the writing mode. In another example, the user may tap the stylus to change to an eraser mode. For instance, the user may tap a fingerprint sensor of the stylus to change to the eraser mode. In one or more embodiments, a stylus may include a display. In one example, the display may display first information that indicates a writing mode of the stylus. For instance, the first information may include a graphic of a pen. In another example, the display may display second information that indicates an eraser mode of the stylus. For instance, the second information may include a graphic of an eraser.

In one or more embodiments, a profile may be utilized in authenticating a user to access a stylus. For example, after the stylus authenticates a user, the stylus may communicate with an information handling system. In one instance, after the stylus authenticates a user, the user may utilize the stylus to write with an application executing on an information handling system. In another instance, after the stylus authenticates a user, the user may utilize the stylus to erase with an application executing on an information handling system. In one or more embodiments, a user may not be authenticated. For example, if the user is not authenticated, the stylus may not switch modes. In one instance, the stylus may not switch from a writing mode to an erasing mode if the user is not authenticated. In another instance, the stylus may continue to be utilized in a writing mode if the user is not authenticated. In one or more embodiments, the display may display error information if the user is not authenticated. In one example, the error information may include an error message. In another example, the error information may include an error graphic.

In one or more embodiments, a response value may be associated with a force value. For example, the force value may be determined via a sensor. In one or more embodiments, it may be determined if a profile includes the force value. If the profile includes the force value, a number of pixels associated with the force value may be determined from the profile. In one instance, the number of pixels associated with the force value may be activated. In another instance, the number of pixels associated with the force value may be deactivated. In one or more embodiments, if the profile does not include the force value, other force values may be determined from one or more profiles of respective one or more other users. For example, if force values from the one or more profiles of respective one or more other users are within a range of the force value, response values respectively associated with the force values from the one or more profiles that are within the range of the force value may be utilized in determining a first response value associated with the first force value. In one instance, a number of pixels may be activated based at least on the first response value. In another instance, a number of pixels may be deactivated based at least on the first response value. In one or more embodiments, the first response value may be stored in the profile. For example, the first response value may be stored in the profile, such that the first response value may be retrieved based at least on the first force value. For instance, the first response value may be stored in the profile for utilization at a later time.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
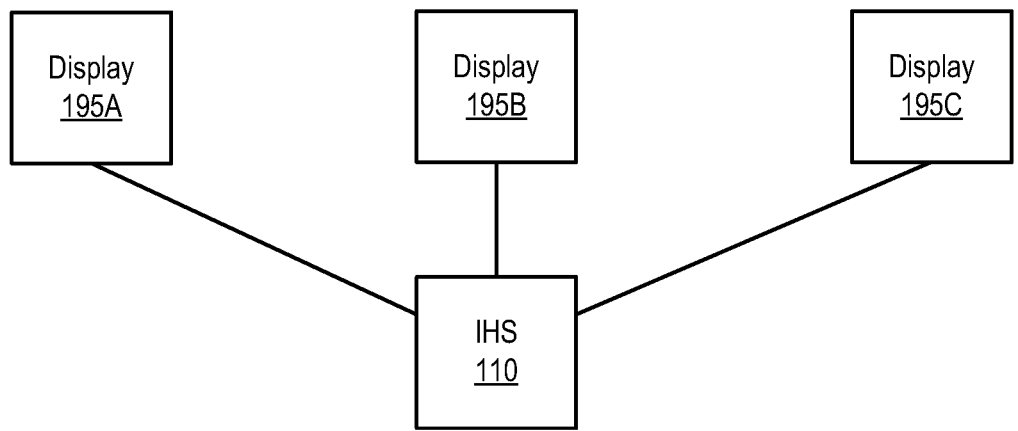
FIGS. 1B and 1C illustrate examples of displays and an example of an information handling system, according to one or more embodiments.
Figure 1C:
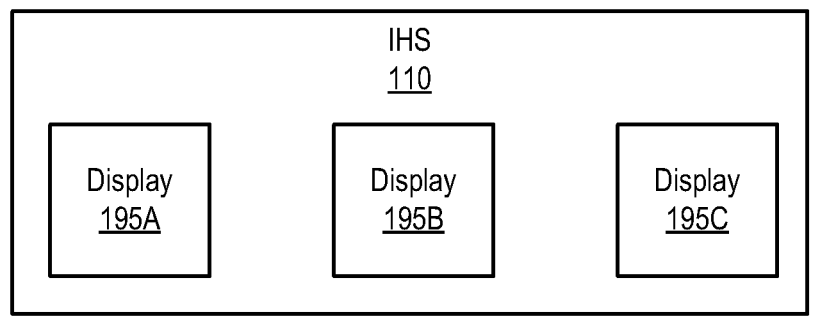

Turning now to FIGS. 1B and 1C, examples of displays and an example of an information handling system are illustrated, according to one or more embodiments. As shown in FIG. 1B, one or more of displays 195A-195C may be coupled to IHS 110. As illustrated in FIG. 1C, IHS 110 may include one or more of displays 195A-195C. In one or more embodiments, display 195 may display information to one or more of a user and a camera, among others. In one or more embodiments, display 195 may be or include a touch screen. In one example, the touch screen may be or include a resistive touch screen. In another example, the touch screen may be or include a capacitive sensing touch screen. Although not specifically illustrated, display 195 may be communicatively coupled to processor 120, according to one or more embodiments. For example, display 195 may be communicatively coupled to processor 120 via one or more of a display adapter, a video controller, and a graphics processing unit, among others.

Figure 2A:
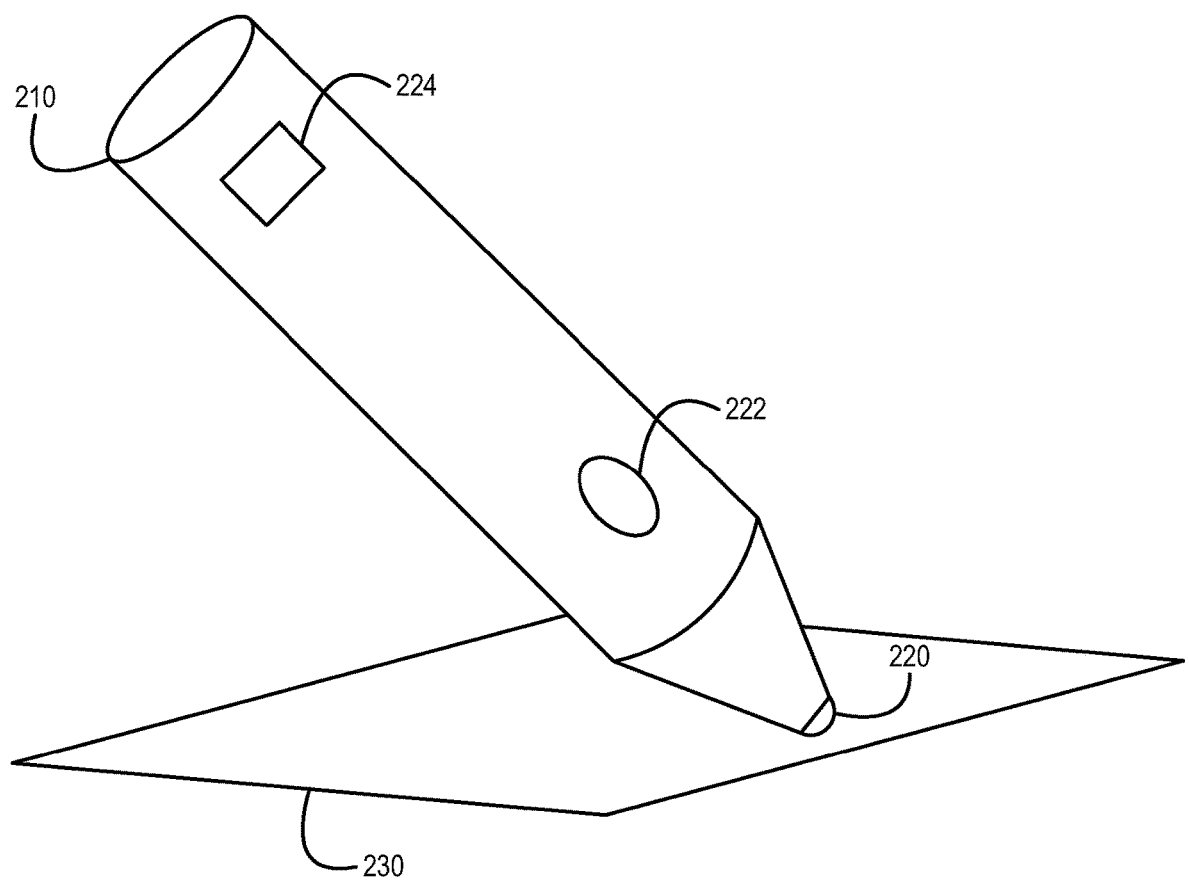
FIGS. 2A and 2B illustrate an example stylus, according to one or more embodiments.
Figure 2B:
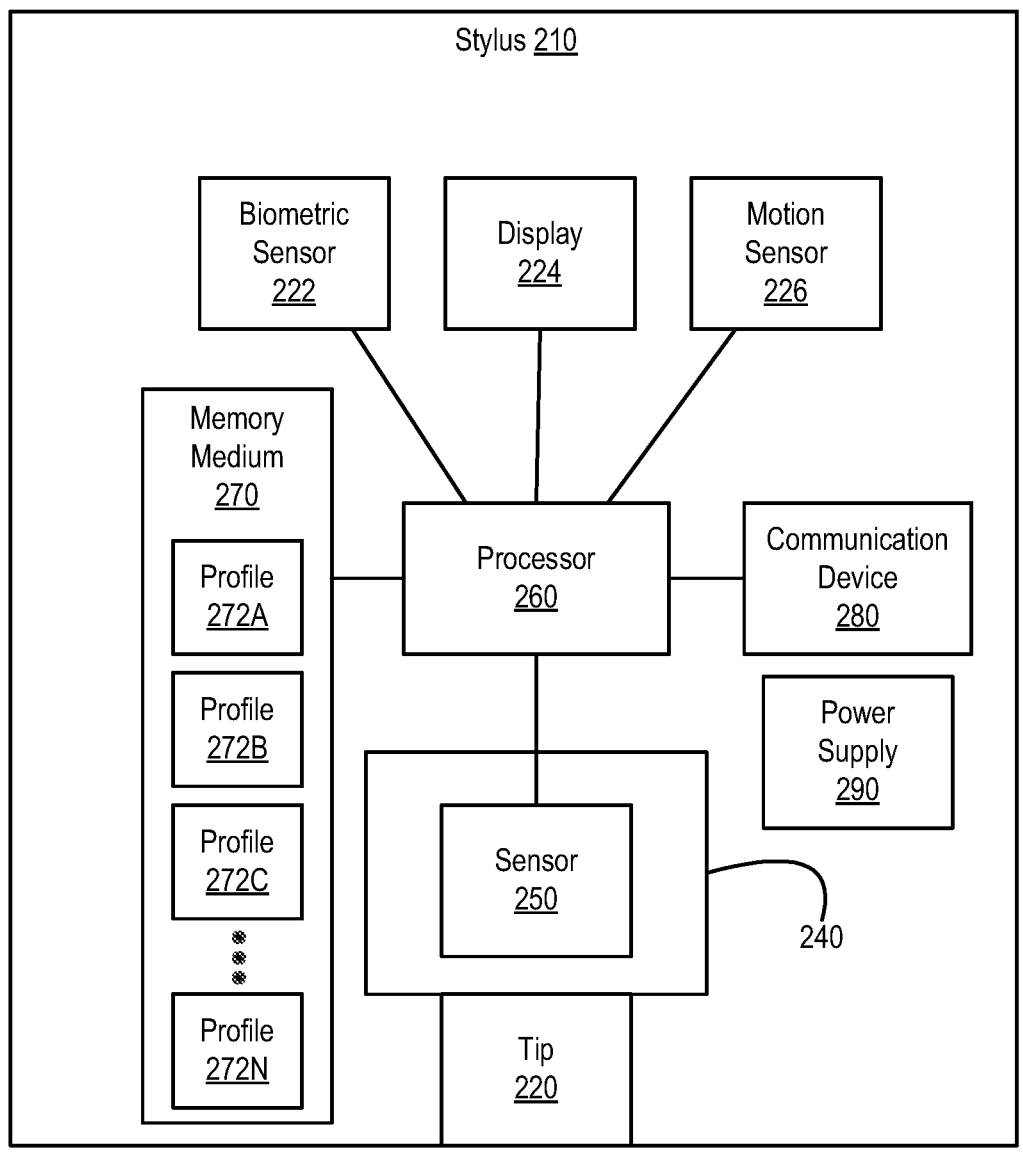

Turning now to FIGS. 2A and 2B, an example stylus is illustrated, according to one or more embodiments. As shown in FIG. 2A, a stylus 210 may include a tip 220. In one or more embodiments, tip 220 may or may not be in contact with a surface 230. In one example, a user may not have tip 220 in contact with surface 230. In another example, the user may have tip 220 in contact with surface 230. In one or more embodiments, surface 230 may be or include any suitable surface. In one example, surface 230 may be or include a flat surface. In a second example, surface 230 may be or include a display (e.g., display 195). In another example, surface 230 may be or include a non-flat surface. For instance, surface 230 may include one or more depressions and/or one or more rises. As illustrated, stylus 210 may include a biometric sensor 222. For example, biometric sensor 222 may determine biometric information of a user. For instance, biometric sensor 222 may determine fingerprint information of a user. As shown, stylus 210 may include a display 224. For example, display 224 may display information. In one instance, display 224 may display text information. In another instance, display 224 may display graphic information.

As illustrated in FIG. 2B, stylus 210 may include a power supply 290. In one or more embodiments, power supply 290 may supply power to one or more components of stylus 210. In one example, power supply 290 may include a capacitor that stores energy via an electric field. In another example, power supply 290 may include a battery that stores chemical energy. Although not specifically illustrated, power supply 290 may coupled to one or more components of stylus 210. As shown, stylus 210 may include a pressure sensing device 240. In one or more embodiments, pressure sensing device 240 may determine a force of pressure of tip 220 in contact with surface 230. For example, pressure sensing device 240 may include one or more of an elastomer material and a spring, among others. In one instance, pressure sensing device 240 may determine a force of pressure of tip 220 in contact with surface 230 via a compression of the one or more of the elastomer material and the spring. In another instance, pressure sensing device 240 may determine a force of pressure of tip 220 in contact with surface 230 via an elongation of the one or more of the elastomer material and the spring. In one or more embodiments, pressure sensing device 240 may be referred to as a force sensing device.

In one or more embodiments, pressure sensing device 240 may provide one or more output signals that indicate one or more forces of pressure of tip 220 in contact with surface 230. In one example, pressure sensing device 240 may provide one or more output digital signals that indicate the one or more forces of pressure. In another example, pressure sensing device 240 may provide one or more output analog signals that indicate the one or more forces of pressure. For instance, the one or more output analog signals may be or include one or more voltages.

As shown, pressure sensing device 240 may include a sensor 250. In one or more embodiments, sensor 250 may determine a force of tip 220 in contact with surface 230. For example, sensor 250 may be or include one or more microelectromechanical systems (MEMS) that may determine a force of tip 220 in contact with surface 230. In one or more embodiments, sensor 250 may include a strain gauge. For example, the strain gauge may output one or more voltages. For instance, the one or more voltages may be associated with one or more compressions and/or one or more elongations of the strain gauge. In one or more embodiments, a voltage from the strain gauge may be converted into digital data. For example, an analog to digital conversion (ADC) system, method, and/or process may convert an analog voltage from the strain gauge into digital data. In one instance, pressure sensing device 240 may include ADC circuitry that may convert one or more analog signals into digital data. In another instance, a processor 260 may include ADC circuitry that may convert one or more analog signals into digital data.

As illustrated, stylus 210 may include biometric sensor 222, display 224, a motion sensor 226, processor 260, a memory medium 270, and a communication device 280. As shown, biometric sensor 222, display 224, motion sensor 226, pressure sensing device 240, memory medium 270, and communication device 280 may be coupled to processor 260. In one or more embodiments, processor 260 may execute processor instructions in implementing at least a portion of one or more systems, flowcharts, methods, and/or processes described herein. In one example, processor 260 may execute processor instructions from memory medium 270 in implementing at least a portion of one or more systems, flowcharts, methods, and/or processes described herein. For instance, memory medium 270 may include the processor instructions. In another example, processor 260 may execute processor instructions via communication device 280 in implementing at least a portion of one or more systems, flowcharts, methods, and/or processes described herein. For instance, communication device 280 may receive processor instructions and provide the processor instructions to one or more of processor 260 and memory medium 270. As illustrated, memory medium 270 may store profiles 272A-272N.

In one or more embodiments, communication device 280 may communicate, with IHS 110, information associated with one or more forces of pressure of tip 220 in contact with surface 230. In one example, communication device 280 may communicate the information to IHS 110 in a wired fashion. In another example, communication device 280 may communicate the information to IHS 110 in a wireless fashion. For instance, communication device 280 may communicate the information to IHS 110 via an ISM (industrial, scientific, and medical) band. In one or more embodiments, communication device 280 may communicate via one or more of IEEE 802.11, WiFi, wireless Ethernet, IEEE 802.15, Bluetooth, BLE, IEEE 802.15.4, ZigBee, Z-Wave, 6LoW-PAN, ANT, ANT+, ANT BLAZE, and a proprietary wireless protocol, among others.

Figure 3:
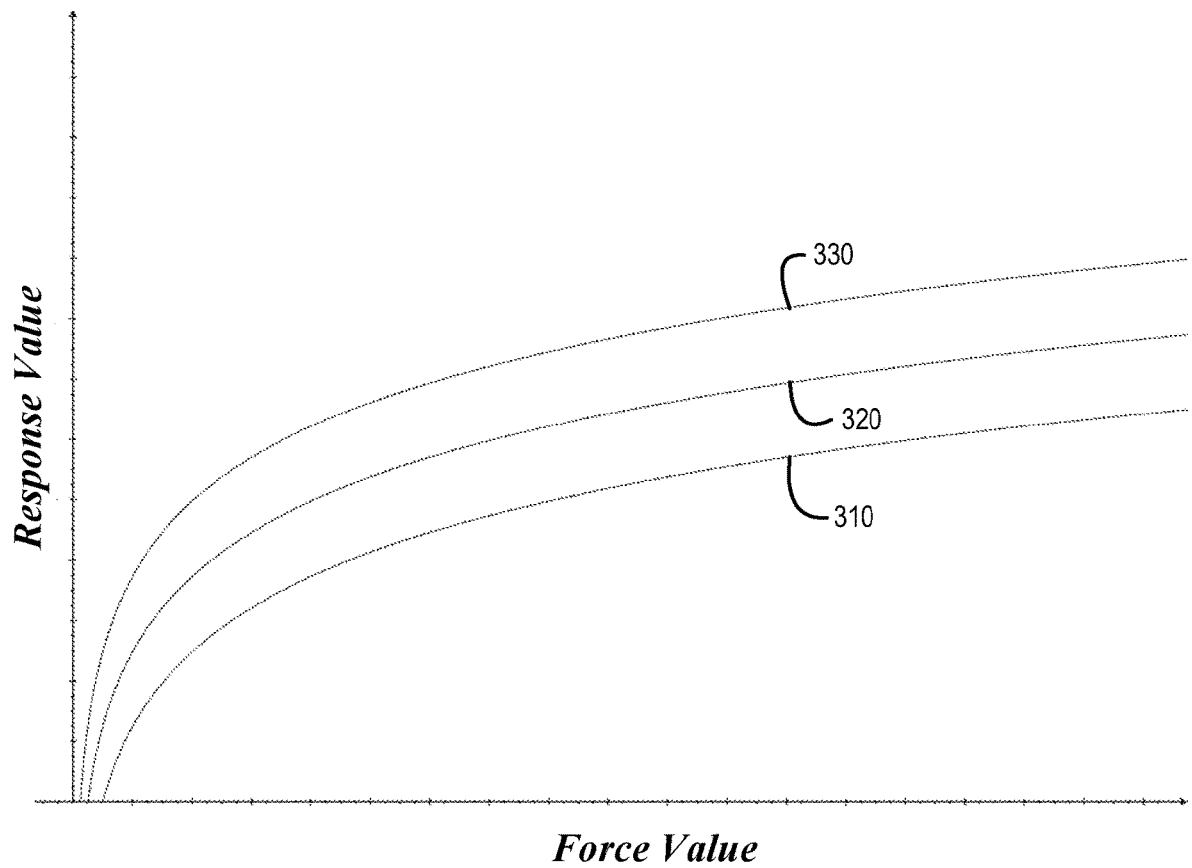
FIG. 3 illustrates examples of response curves, according to one or more embodiments.

Turning now to FIG. 3, examples of response curves are illustrated, according to one or more embodiments. As shown, three example response curves 310-330 are shown. In one example, response curve 310 may be associated with a first mode of utilization of stylus 210. In a second example, response curve 320 may be associated with a second mode of utilization of stylus 210. In another example, response curve 330 may be associated with a third mode of utilization of stylus 210. As illustrated, response curves 310-330 may be based at least on a logarithmic function. For example, the horizontal axis of FIG. 3 may be associated with input forces (e.g., pressures), and the vertical axis of FIG. 3 may be associated with response values based at least on the input forces. For instance, the forces on the horizontal axis may be scaled in accordance with one or more embodiments and/or one or more implementations. In one example, response curve 310 may be associated with $f_R(x)=71.723 \cdot Ln(x)-115.43$. In a second example, response curve 320 may be associated with $f_R(x)=71.723 \cdot Ln(x)-165.15$. In another example, response curve 330 may be associated with $f_R(x)=71.723 \cdot Ln(x)-214.86$. Other response curves associated with other modes of utilization of stylus 210 may be utilized, according to one or more embodiments. In one or more embodiments, a response curve may be associated with a type of stylus utilization. In one example, response curve 310 may be suitable for graphical user interface operations. In a second example, response curve 320 may be suitable for note-taking. In another example, response curve 330 may be suitable for artistic work. In one or more embodiments, a response curve may be associated with an eraser mode of stylus 210. For example, response curve 310 may be suitable for an eraser mode of stylus 210.

Figure 4A:
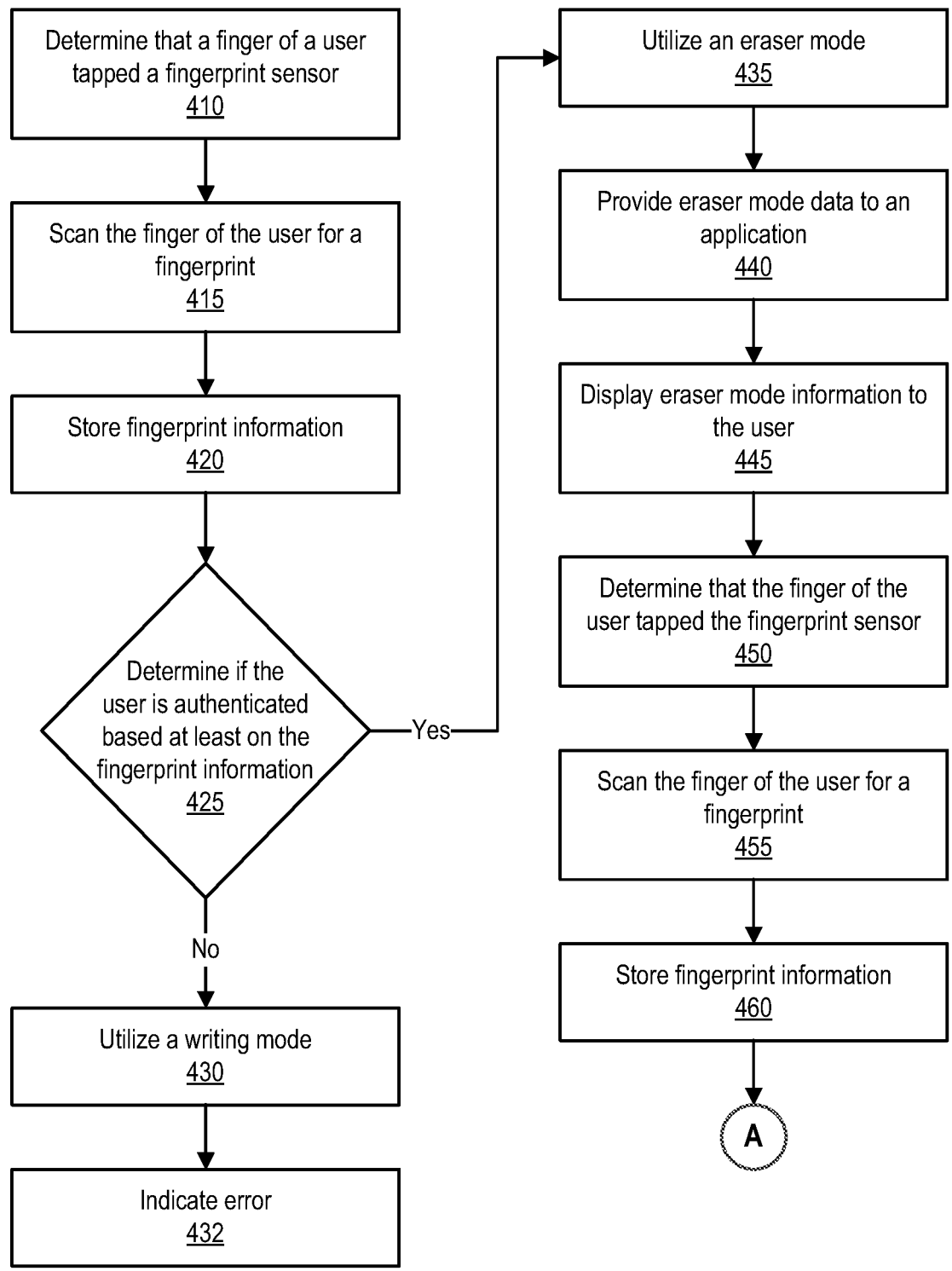
FIGS. 4A and 4B illustrate an example of a method of operating a stylus, according to one or more embodiments.
Figure 4B:
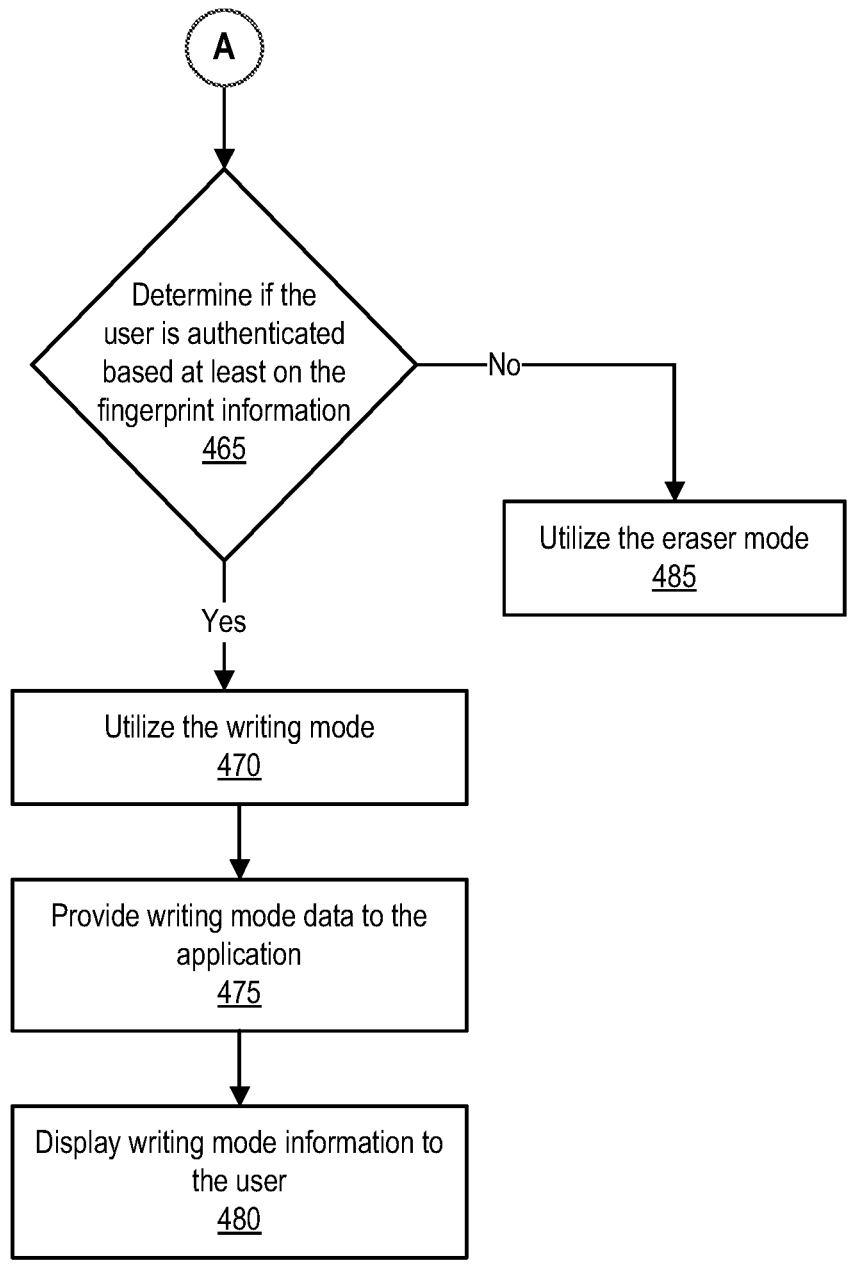

Turning now to FIGS. 4A and 4B, an example of a method of operating a stylus is illustrated, according to one or more embodiments. At 410, it may be determined that a finger of a user tapped a fingerprint sensor. For example, it may be determined that a finger of a user tapped biometric sensor 222 of stylus 210. In one or more embodiments, determining that a finger of a user tapped a fingerprint sensor may include utilizing motion sensor 226. For example, motion sensor 226 may be or include a digital accelerometer. For instance, the motion sensor 226 may determine one or more accelerations from the finger of the user tapping biometric sensor 222.

At 415, the fingerprint sensor may scan the finger of the user for a fingerprint. For example, biometric sensor 222 may determine fingerprint information from the finger of the user. In one or more embodiments, biometric sensor 222 may scan the finger of the user to produce a digital image of the fingerprint associated with the user. For example, the digital image may be transformed into fingerprint information associated with the user. At 420, the fingerprint information may be stored. For example, the fingerprint information associated with the user may be stored via memory medium 270 of stylus 210.

At 425, it may be determined if the user is authenticated based at least on the fingerprint information. In one or more embodiments, a profile may store fingerprint information associated with a user. In one example, profile 272B may store fingerprint information associated with a first user. In a second example, profile 272C may store fingerprint information associated with a second user. In one or more embodiments, determining if the user is authenticated based at least on the fingerprint information may include searching one or more of profiles 272A-272N to determine if the fingerprint information associated with the user matches fingerprint information of a profile of one or more of profiles 272A-272N. If the fingerprint information associated with the user matches fingerprint information of a profile of one or more of profiles 272A-272N, the user may be authenticated; otherwise, the user may not be authenticated.

If the user is not authenticated, stylus 210 may continue to utilize a writing mode, at 430. At 432, an error may be indicated. In one or more embodiments, indicating the error may include displaying error information via display 224 of stylus 210. In one example, the error information may indicate that the user was not authenticated. In a second example, the error information may include text error information. In another example, the information may include graphical error information. If the user is authenticated, stylus 210 may utilize an eraser mode, at 435. At 440, eraser mode data may be provided to an application. For example, stylus 210 may provide eraser mode data to an APP of APPs 164-168. In one or more embodiments, eraser mode data may be provided to an application in response to utilizing the eraser mode. At 445, eraser mode information may be displayed to the user. In one example, display 224 may display text information, which indicates the eraser mode, to the user. In another example, display 224 may display graphical information, which indicates the eraser mode, to the user. For instance, an eraser symbol and/or graphic may be displayed via display 224.

At 450, it may be determined that the finger of the user tapped the fingerprint sensor. For example, it may be determined that the finger of the user tapped biometric sensor 222 of stylus 210. In one or more embodiments, determining that the finger of the user tapped the fingerprint sensor may include utilizing motion sensor 226. For example, motion sensor 226 may be or include a digital accelerometer. For instance, the motion sensor 226 may determine one or more accelerations from the finger of the user tapping biometric sensor 222. At 455, the fingerprint sensor may scan the finger of the user for a fingerprint. For example, biometric sensor 222 may determine fingerprint information from the finger of the user. In one or more embodiments, biometric sensor 222 may scan the finger of the user to produce a digital image of the fingerprint associated with the user. For example, the digital image may be transformed into fingerprint information associated with the user.

At 460, the fingerprint information may be stored. For example, the fingerprint information associated with the user may be stored via memory medium 270 of stylus 210. At 465, it may be determined if the user is authenticated based at least on the fingerprint information. In one or more embodiments, a profile may store fingerprint information associated with a user. In one example, profile 272B may store fingerprint information associated with a first user. In a second example, profile 272C may store fingerprint information associated with a second user. In one or more embodiments, determining if the user is authenticated based at least on the fingerprint information may include searching one or more of profiles 272A-272N to determine if the fingerprint information associated with the user matches fingerprint information of a profile of one or more of profiles 272A-272N. If the fingerprint information associated with the user matches fingerprint information of a profile of one or more of profiles 272A-272N, the user may be authenticated; otherwise, the user may not be authenticated.

If the user is authenticated, stylus 210 may utilize the writing mode, at 470. At 475, writing mode data may be provided to the application. For example, stylus 210 may provide writing mode data to the APP of APPs 164-168. In one or more embodiments, writing mode data may be provided to the application in response to utilizing the writing mode. At 480, writing mode information may be displayed to the user. In one example, display 224 may display text information, which indicates the writing mode, to the user. In another example, display 224 may display graphical information, which indicates the writing mode, to the user. For instance, a pen symbol and/or graphic may be displayed via display 224. If the user is not authenticated, stylus 210 may continue to utilize the eraser mode, at 485.

Figure 5A:
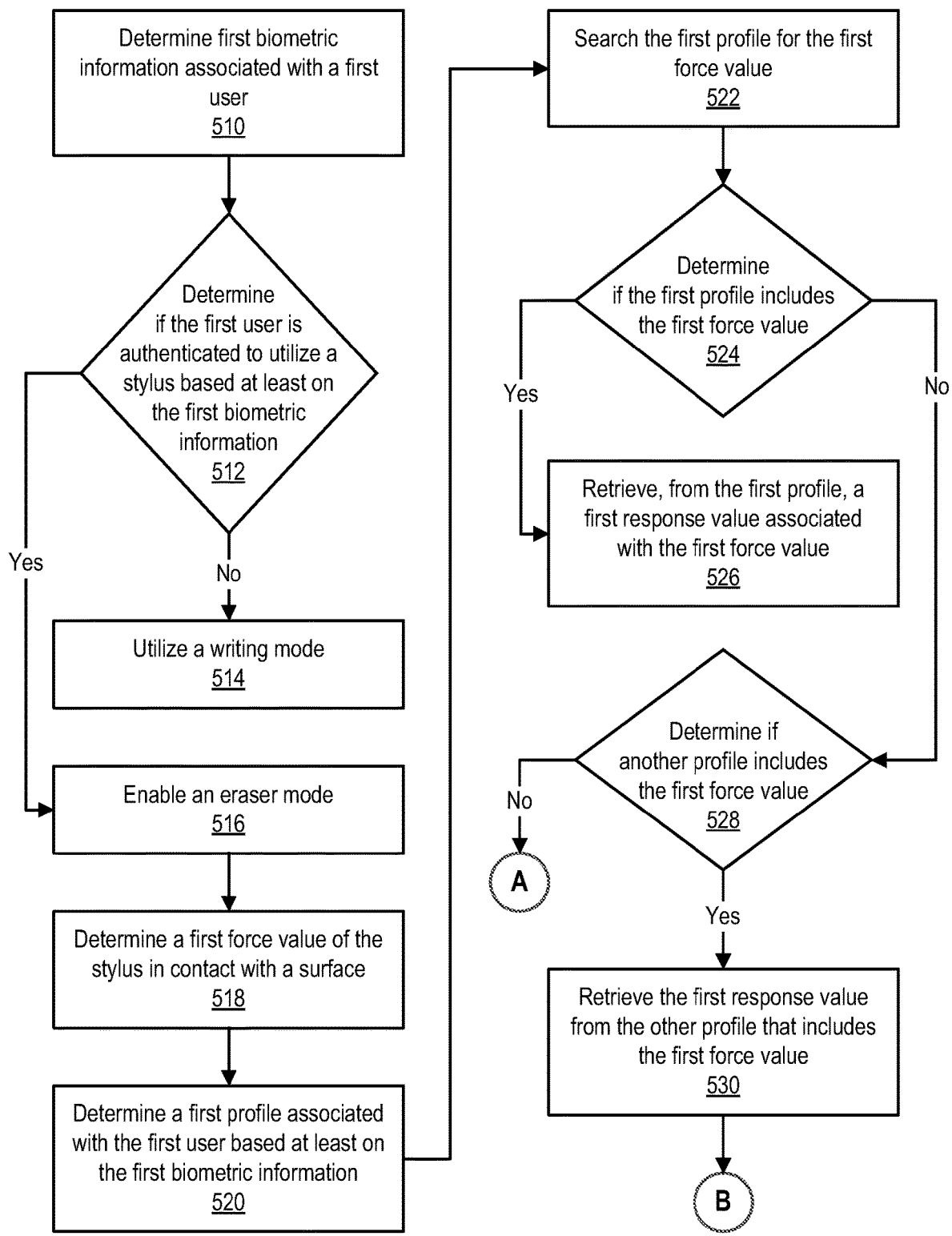
FIGS. 5A and 5B illustrate an example of another method of operating a stylus is illustrated, according to one or more embodiments.
Figure 5B:
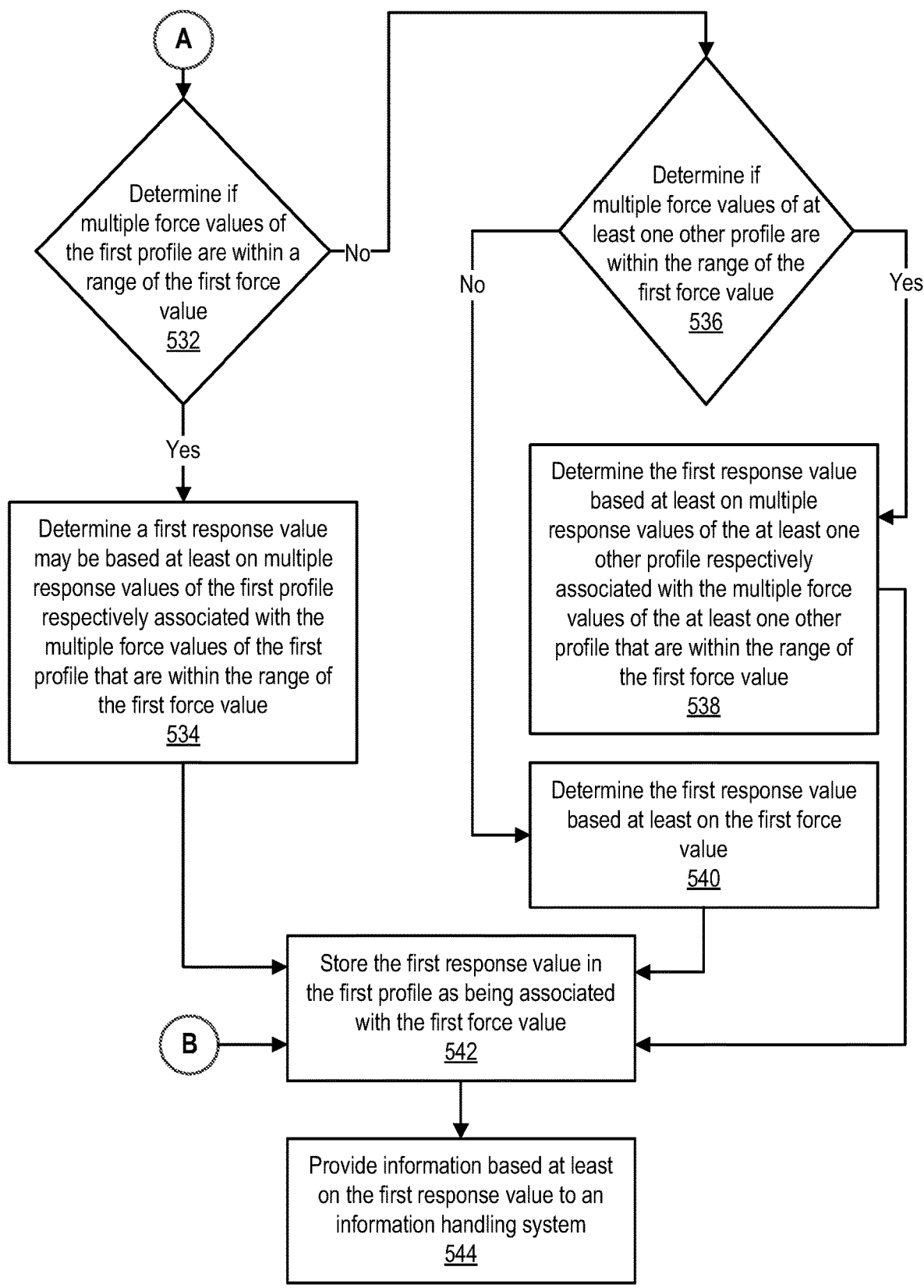

Turning now to FIGS. 5A and 5B, an example of another method of operating a stylus is illustrated, according to one or more embodiments. At 510, first biometric information associated with a first user may be determined. For example, first biometric information associated with a first user may be determined via a biometric sensor. For instance, the biometric sensor may be biometric sensor 222. At 512, it may be determined if the first user is authenticated to utilize a stylus based at least on the first biometric information. For example, it may be determine if the first user is authenticated to utilize 210 based at least on the first biometric information.

If the first user is not authenticated to utilize the stylus, the stylus may be utilized in a writing mode, at 514. If the first user is authenticated to utilize the stylus, an eraser mode may be enabled, at 516. In one or more embodiments, enabling an eraser mode of the stylus may include allowing and/or permitting utilization of the writing mode of the stylus and/or the eraser mode of the stylus. For example, the first user may switch between the writing mode of the stylus and the eraser mode of the stylus.

At 518, a first force value of the stylus in contact with a surface may be determined. For example, a first force value of stylus 210 in contact with surface 230 may be determined. For instance, determining a first force value of stylus 210 in contact with surface 230 may include determining a first force value of tip 220 in contact with surface 230. In one or more embodiments, the first force value may be or include a number. For example, the number may be associated with a unit of measurement. In one instance, the unit of measurements may be or include grams (e.g., grams at 9.8 m/s$^2$). In another instance, the unit of measurements may be or include Newtons.

At 520, a first profile associated with the first user based at least on the first biometric information may be determined. For example, a profile of profiles 272A-272N may be determined. At 522, the first profile may be searched for the first force value. For example, the first profile may be profile 272B. For instance, profile 272B may be searched for the first force value. In one or more embodiments, the first profile may be populated with one or more initial force values and associated respective response values. For example, profile 272B may be populated with initial force values and associated respective response values of Table 1.

TABLE 1

| Force (grams) | Response Value |
|---|---|
| 50 | 1.6989 |
| 75 | 1.8750 |
| 100 | 2.000 |
| 125 | 2.0969 |
| 150 | 2.1760 |
| 175 | 2.2430 |
| 200 | 2.3010 |
| 225 | 2.3521 |

At 524, it may be determined if the first profile includes the first force value. If the first profile includes the first force value, a first response value associated with the first force value may be retrieved from the first profile, at 526. For example, the first profile may include a data structure of force values and response values, where force values are associated with respective response values. For instance, a first response value associated with the first force value may be retrieved from the data structure of the first profile. In one or more embodiments, the data structure may be or include a table of force values and response values, where force values are associated with respective response values. In one or more embodiments, one or more new force values and associated respective new one or more new response values may be stored via the data structure.

If the first profile does not include the first force value, it may be determined if another profile includes the first force value, at 528. For example, the other profile may include one of profiles 272A and 272C-272N. If the other profile includes the first force value, a response value may be retrieved from the other profile that is respectively associated with the first force value, at 530. For example, the first response value may be determined as the response value of the other profile respectively associated with the first force value.

If the other profile does not include the first force value, it may be determined if multiple force values of the first profile are within a range of the first force value, at 532. If the multiple force values of the first profile are within the range of the first force value, a first response value may be determined based at least on multiple response values of the first profile respectively associated with the multiple force values of the first profile that are within the range of the first force value, at 534.

In one or more embodiments, determining a first response value based at least on multiple response values of the first profile respectively associated with the multiple force values of the first profile that are within the range of the first force value may include utilizing an interpolation process and/or method that may generate an approximation from multiple response values of the first profile respectively associated with the multiple force values of the first profile that are within the range of the first force value. For example, the interpolation process and/or method that may generate an approximation from nearby force values of the first profile. For instance, the interpolation process and/or method that may generate an approximation by averaging response values associated with respective force values that are within the range of the first force value. In one or more embodiments, the interpolation process and/or method may generate a first response value as a nearest table entry. For example, the interpolation process and/or method may generate a first response value as a response value associated with a force value that is nearest to the first force value. In one or more embodiments, the interpolation process and/or method may compute a curve fit between or among two or more response values associated with two or more bounding response values. For example, the two or more bounding response values may be associated with respective two or more bounding force values.

If the multiple force values of the first profile are not within the range of the first force value, it may be determined if multiple force values of at least one other profile are within the range of the first force value, at 536. If the multiple force values of the at least one other profile are within the range of the first force value, the first response value may be determined based at least on multiple response values of the at least one other profile respectively associated with the multiple force values of the at least one other profile that are within the range of the first force value, at 538. For example, the at least one other profile may include one or more of profiles 272A and 272C-272N. In one or more embodiments, determining the first response value based at least on multiple response values of the at least one other profile respectively associated with the multiple force values of the at least one other profile that are within the range of the first force value may include utilizing an interpolation process and/or method that may generate an approximation from multiple force values of the at least one other profile that are within the range of the first force value.

In one or more embodiments, determining a first response value based at least on multiple response values of the at least one other profile respectively associated with the multiple force values of the at least one other profile that are within the range of the first force value may include utilizing an interpolation process and/or method that may generate an approximation from multiple response values of the at least one other profile respectively associated with the multiple force values of the at least one other profile. For example, the interpolation process and/or method that may generate an approximation from nearby force values of the at least one other profile that are within the range of the first force value. For instance, the interpolation process and/or method that may generate an approximation by averaging response values associated with respective force values that are within the range of the first force value. In one or more embodiments, the interpolation process and/or method may generate a first response value as a nearest table entry. For example, the interpolation process and/or method may generate a first response value as a response value associated with a force value that is nearest to the first force value. In one or more embodiments, the interpolation process and/or method may compute a curve fit between or among two or more response values associated with two or more bounding response values. For example, the two or more bounding response values may be associated with respective two or more bounding force values.

If the multiple force values of the at least one other profile are not within the range of the first force value, the first response value may be determined based at least on the first force value, at 540. In one or more embodiments, determining the first response value based at least on the first force value may include computing a value of a function. For example, computing the value of the function may include computing a logarithm based at least on the first force value. In one instance the function may generate curve 310, as shown in FIG. 3. In a second instance the function may generate curve 320, as shown in FIG. 3. In another instance the function may generate curve 330, as shown in FIG. 3.

At 542, the first response value may be stored in the first profile as being associated with the first force value. For example, the first response value may be stored in profile 272B. For instance, the first response value as being associated with the first force value may be stored in profile 272B. At 544, information based at least on the first response value may be provided to an information handling system. For example, stylus 210 may provide information based at least on the first response value to IHS 210. In one or more embodiments, stylus 210 may utilize communication device 280 to provide information based at least on the first response value to IHS 210.

In one or more embodiments, the information based at least on the first response value may be or include the first response value. In one or more embodiments, the information based at least on the first response value may be or include a number of pixels. In one example, the number of pixels may be a number of pixels to draw on a display. In one instance, stylus 210 may be in a writing mode. In another instance, the number of pixels to draw on the display may be based at least on the first response value. In another example, the number of pixels may be a number of pixels to erase on a display. In one instance, stylus 210 may be in an eraser mode. In another instance, the number of pixels to erase on the display may be based at least on the first response value.

In one or more embodiments, determining the first response value from the first profile or determining the first response value from the at least one other profile may be advantageous. For example, an advantage may be reducing a number of computations. In one instance, reducing a number of computations may improve response time of stylus 210. In another instance, reducing a number of computations may improve an energy storage time of power supply 290 (e.g., by stylus 210 utilizing less energy).

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A stylus, comprising:
   a processor;
   a force sensor that is coupled to the processor and that is configured to measure forces of the stylus in contact with a surface;
   a biometric sensor coupled to the processor; and
   a memory medium that is coupled to the processor and that includes instructions, which when executed by the processor, cause the stylus to:
   determine, via the biometric sensor, first biometric information associated with a first user;
   determine that the first user is authenticated to utilize the stylus based at least on the first biometric information;
   determine, via the force sensor, a first force value of the stylus in contact with the surface;
   determine a first profile associated with the first user based at least on the first biometric information;

search the first profile for the first force value;
determine that the first force value is not included by the first profile;
determine if a plurality of force values of the first profile are within a range of the first force value;
if the plurality of force values of the first profile are within the range of the first force value, determine a first response value based at least on a plurality of response values of the first profile respectively associated with the plurality of force values of the first profile that are within the range of the first force value;
if the plurality of force values of the first profile are not within the range of the first force value, determine if a plurality of force values of at least one other profile are within the range of the first force value;
if the plurality of force values of the at least one other profile are within the range of the first force value, determine the first response value based at least on a plurality of response values of the at least one other profile respectively associated with the plurality of force values of the at least one other profile that are within the range of the first force value;
if the plurality of force values of the at least one other profile are not within the range of the first force value, determine the first response value based at least on the first force value;
store the first response value in the first profile as being associated with the first force value; and
provide information based at least on the first response value to an information handling system.

2. The stylus of claim 1, wherein, to determine the first response value based at least on the first force value, the instructions further cause the stylus to compute a logarithm based at least on the first force value.

3. The stylus of claim 1, wherein, to determine the first response value based at least on the plurality of values of the first profile respectively associated with the plurality of force values of the first profile that are within the range of the first force value, the instructions further cause the stylus to interpolate the first value based at least on the plurality of values of the first profile respectively associated with the plurality of force values of the first profile that are within the range of the first force value.

4. The stylus of claim 1, wherein, to determine the first response value based at least on the plurality of values of the at least one other profile associated with the plurality of force values of the at least one other profile that are within the range of the first force value, the instructions further cause the stylus to interpolate the first value based at least on the plurality of values of the at least one other profile respectively associated with the plurality of force values of the at least one other profile that are within the range of the first force value.

5. The stylus of claim 1, wherein the instructions further cause the stylus to:
determine that the at least one other profile includes the first force value;
retrieve a response value of the at least one other profile associated with the first force value; and
determine the first response value as the response value of the at least one other profile associated with the first force value.

6. The stylus of claim 1,
wherein the instructions further cause the stylus to determine that the stylus is in an eraser mode; and
wherein, to provide information based at least on the first response value to the information handling system, the instructions further cause the stylus to provide, to the information handling system, information that indicates a number of pixels of a display should be changed based at least on the first response value and the eraser mode.

7. The stylus of claim 1, wherein the instructions further cause the stylus to:
determine that the first user taps a biometric sensor of the stylus;
after determining that the first user is authenticated to utilize the stylus based at least on the first biometric information and after determining that the first user taps the biometric sensor of the stylus, switch from a writing mode of the stylus to an eraser mode of the stylus.

8. The stylus of claim 1,
wherein the instructions further cause the stylus to acquire, via the biometric sensor, a fingerprint from the first user; and
wherein, to determine the first biometric information associated with the first user, the instructions further cause the stylus to determine the first biometric information from the fingerprint.

9. The stylus of claim 1, wherein the first biometric information includes first fingerprint information associated with the first user.

10. The stylus of claim 1, wherein the instructions further cause the stylus to:
determine that the first force value is included by the first profile; and
retrieve the first response value from the first profile.

11. A method, comprising:
determining first biometric information associated with a first user;
determining that the first user is authenticated to utilize the stylus based at least on the first biometric information;
determining, via a force sensor, a first force value of the stylus in contact with a surface;
determining a first profile associated with the first user based at least on the first biometric information;
searching the first profile for the first force value;
determining that the first force value is not included by the first profile;
determining if a plurality of force values of the first profile are within a range of the first force value;
if the plurality of force values of the first profile are within the range of the first force value, determining a first response value based at least on a plurality of response values of the first profile respectively associated with the plurality of force values of the first profile that are within the range of the first force value;
if the plurality of force values of the first profile are not within the range of the first force value, determining if a plurality of force values of at least one other profile are within the range of the first force value;
if the plurality of force values of the at least one other profile are within the range of the first force value, determining the first response value based at least on a plurality of response values of the at least one other profile respectively associated with the plurality of force values of the at least one other profile that are within the range of the first force value;

if the plurality of force values of the at least one other profile are not within the range of the first force value, determining the first response value based at least on the first force value;

storing the first response value in the first profile as being associated with the first force value; and providing information based at least on the first response value to an information handling system.

12. The method of claim 11, wherein the determining the first response value based at least on the first force value includes computing a logarithm based at least on the first force value.

13. The method of claim 11, wherein the determining the first response value based at least on the plurality of values of the first profile respectively associated with the plurality of force values of the first profile that are within the range of the first force value includes interpolating the first value based at least on the plurality of values of the first profile respectively associated with the plurality of force values of the first profile that are within the range of the first force value.

14. The method of claim 11, wherein the determining the first response value based at least on the plurality of values of the at least one other profile associated with the plurality of force values of the at least one other profile that are within the range of the first force value includes interpolating the first value based at least on the plurality of values of the at least one other profile respectively associated with the plurality of force values of the at least one other profile that are within the range of the first force value.

15. The method of claim 11, further comprising:
determining that the at least one other profile includes the first force value;
retrieving a response value of the at least one other profile associated with the first force value; and
determining the first response value as the response value of the at least one other profile associated with the first force value.

16. The method of claim 11, further comprising:
determining that the stylus is in an eraser mode;
wherein the providing information based at least on the first response value to the information handling system includes providing, to the information handling system, information that indicates a number of pixels of a display should be changed based at least on the first value and the eraser mode.

17. The method of claim 11, further comprising:
determining that the first user taps a biometric sensor of the stylus;
after the determining that the first user is authenticated to utilize the stylus based at least on the first biometric information and after the determining that the first user taps the biometric sensor of the stylus, switching from a writing mode of the stylus to an eraser mode of the stylus.

18. The method of claim 11, further comprising:
a biometric sensor of the stylus acquiring a fingerprint from the first user;
wherein the stylus determining the first biometric information associated with the first user includes determining the first biometric information from the fingerprint.

19. The method of claim 11, wherein the first biometric information includes first fingerprint information associated with the first user.

20. The method of claim 11, further comprising:
determining that the first force value is included by the first profile; and
retrieving the first response value from the first profile.

* * * * *